(12) United States Patent
Bingham (10) Patent No.: US 7,243,268 B2
(45) Date of Patent: Jul. 10, 2007

(54) SEQUENTIAL COORDINATION OF TEST EXECUTION AND DYNAMIC DATA

(75) Inventor: David Bingham, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 521 days.

(21) Appl. No.: 10/736,835

(22) Filed: Dec. 17, 2003

(65) Prior Publication Data

US 2005/0137842 A1 Jun. 23, 2005

(51) Int. Cl.
*G06F 11/00* (2006.01)
(52) U.S. Cl. .......................... 714/43; 714/30; 714/31; 714/32; 714/33
(58) Field of Classification Search ............ 714/30–33
See application file for complete search history.

(56) References Cited

U.S. PATENT DOCUMENTS

2003/0065986 A1 * 4/2003 Fraenkel et al. .............. 714/47
2003/0115252 A1 * 6/2003 Boudnik et al. ............ 709/202

OTHER PUBLICATIONS

Agilent Technologies Inc., Information Sheet on "Agilent OSS QoS Manager", Prior to Dec. 17, 2003. http://we.home.agilent.com/cgi-bin/bvpub/agilent/Product/cp_Product.jsp?NAV_ID= -53.

* cited by examiner

*Primary Examiner*—Robert Beausoliel
*Assistant Examiner*—Charles Ehne (57) ABSTRACT

An apparatus having: an agent; and a first test session servlet running on the agent, receiving a test description in a predetermined format from a caller, threading a first test session that invokes the agent to run the at least one subtest. The test description has at least one predefined subtest, dynamic data, and predefined test parameters. The first test session servlet receives test results from the first test session, and sends the subtest results from the at least one subtest and the dynamic data back to the caller.

14 Claims, 5 Drawing Sheets

SEQUENTIAL COORDINATION OF TEST EXECUTION AND DYNAMIC DATA

BACKGROUND OF THE INVENTION

1. Field of the Invention

The present invention relates to an apparatus for coordinating test execution and dynamic data, and more particularly, to an apparatus for testing a network and sequentially coordinating test execution and dynamic data.

2. Description of the Related Art

The term 'test software' is used to describe a software product whose primary function is to examine how a system is functioning. The test software collects its input from agents, which are individual members of the system under examination.

Some examples of implementations of test software are: river water quality monitors, automobile performance test systems, and telecommunications network test systems.

Some systems under examination are geographically or temporally distributed. The test software for such systems needs to collect data from different locations or different times, to completely test the system. The test software also needs coordination and exchange of data that changes during the test (dynamic data) between different parts of the system, to carry out the examination in a meaningful manner.

A 'sequence test' can be used to test a network. The sequence test allows an agent to run a sequence of predesigned tests in accordance with the agent's scheduler. The agent's scheduler takes into account all of the tasks (tests and subtests) the agent is supposed to accomplish, and determines when the tasks are run.

This solution has several disadvantages. For example, there is no "on-demand" ability to run the sequence of tests. In other words, in the sequence test, if a user wants to run a test or sequence of tests on an agent, the agent's scheduler determines when the tests are run, not the user.

Further, the sequence test has limited dynamic test data capabilities. In other words, dynamic test data, or dynamic data (data that changes during the tests) can only be shared inside a singular sequence. Additionally, the sequence test has no remote session capabilities; the sequence will only run on the specified agent. Thus, the sequence test has no ability to interact with other software applications, such as third party software applications.

Additionally, if a specified agent had both a standard network interface (for example, a LAN (Local-Area Network) interface) and a transient interface (for example GPRS (General Packet Radio Service), or dialup), the sequence test can only test one or the other.

SUMMARY OF THE INVENTION

Accordingly, it is an aspect of the present invention to provide on-demand access to predefined tests, and thereby provide an integration point to run the predefined tests. It is another aspect of the present invention to provide sharing of dynamic data between two or more tests running on an agent, and between remote test sessions, as well as provide sharing of dynamic data with third party software or custom modules.

It is yet another aspect of the present invention to enforce sequential execution of tests. It is still yet another aspect of the present invention to enable source based routing of tests over the correct transient interfaces. It is another aspect of the present invention to provide cascading levels of test sessions that can be called one from another as needed, in which each test and test session can add to, or modify dynamic data from prior tests or test sessions.

Additional aspects and/or advantages of the invention will be set forth in part in the description which follows, and in part, will be obvious from the description, or may be learned by practice of the invention.

The foregoing and/or other aspects of the present invention are achieved by providing an apparatus including: (a) an agent; and (b) a first test session servlet running on the agent. The first test session servlet receives a test from a caller, threads a test session that invokes the agent to run the test, receives test results from the test session, and sends the test results back to the caller.

The foregoing and/or other aspects of the present invention are also achieved by providing an apparatus including: (a) an agent; and (b) a first test session servlet running on the agent, receiving a test description in a predetermined format from a caller, threading a first test session that invokes the agent to run the at least one subtest. The test description includes at least one predefined subtest, dynamic data, and predefined test parameters. And the first test session servlet receives subtest results from the first test session, and sends the subtest results from the at least one subtest and the dynamic data back to the caller.

The foregoing and/or other aspects of the present invention are also achieved by providing an apparatus including: (a) a first agent; and (b) a first test session servlet running on the first agent, receiving a test description in a predetermined format from a caller, threading a first test session that invokes the first agent to run a first subtest of the at least two subtests. The test description includes at least one predefined subtest, dynamic data, and predefined test parameters. When a second subtest of the at least two subtests is defined to run on a second test session, the second subtest: invokes a second test session servlet running on a second agent to thread the second test session; sends a second subtest description, including test parameters for the second subtest and the dynamic data, to the second test session servlet, the second test session invoking the second agent to run the second subtest; and receives second subtest results and the dynamic data from the second test session servlet. The first test session servlet also receives subtest results from the first test session and sends subtest results from all subtests and the dynamic data back to the caller.

The foregoing and/or other aspects of the present invention are also achieved by providing an apparatus including: (a) an agent on a network; and (b) a first test session servlet running on the agent, receiving a test description in a predetermined format over the network from a caller, threading a first test session that invokes the agent to run the at least one subtest to test the network. The test description includes at least one predefined subtest, dynamic data, and predefined test parameters. And the first test session servlet receives subtest results from the first test session and sends the subtest results from the at least one subtest and the dynamic data back to the caller.

The foregoing and/or other aspects of the present invention are also achieved by providing a method including: (a) receiving a test description in a predetermined format over a network from a caller, in which the test description includes at least one predefined subtest, dynamic data, and predefined test parameters; (b) threading a test session that invokes an agent on the network to run the at least one subtest to test the network; and (c) sending results from the at least one subtest and the dynamic data back to the caller.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Reference will now be made in detail to embodiments of the present invention, examples of which are illustrated in the accompanying drawings, wherein like reference numerals refer to the like elements throughout. The embodiments described below explain the present invention by referring to the figures.

Figure 1:
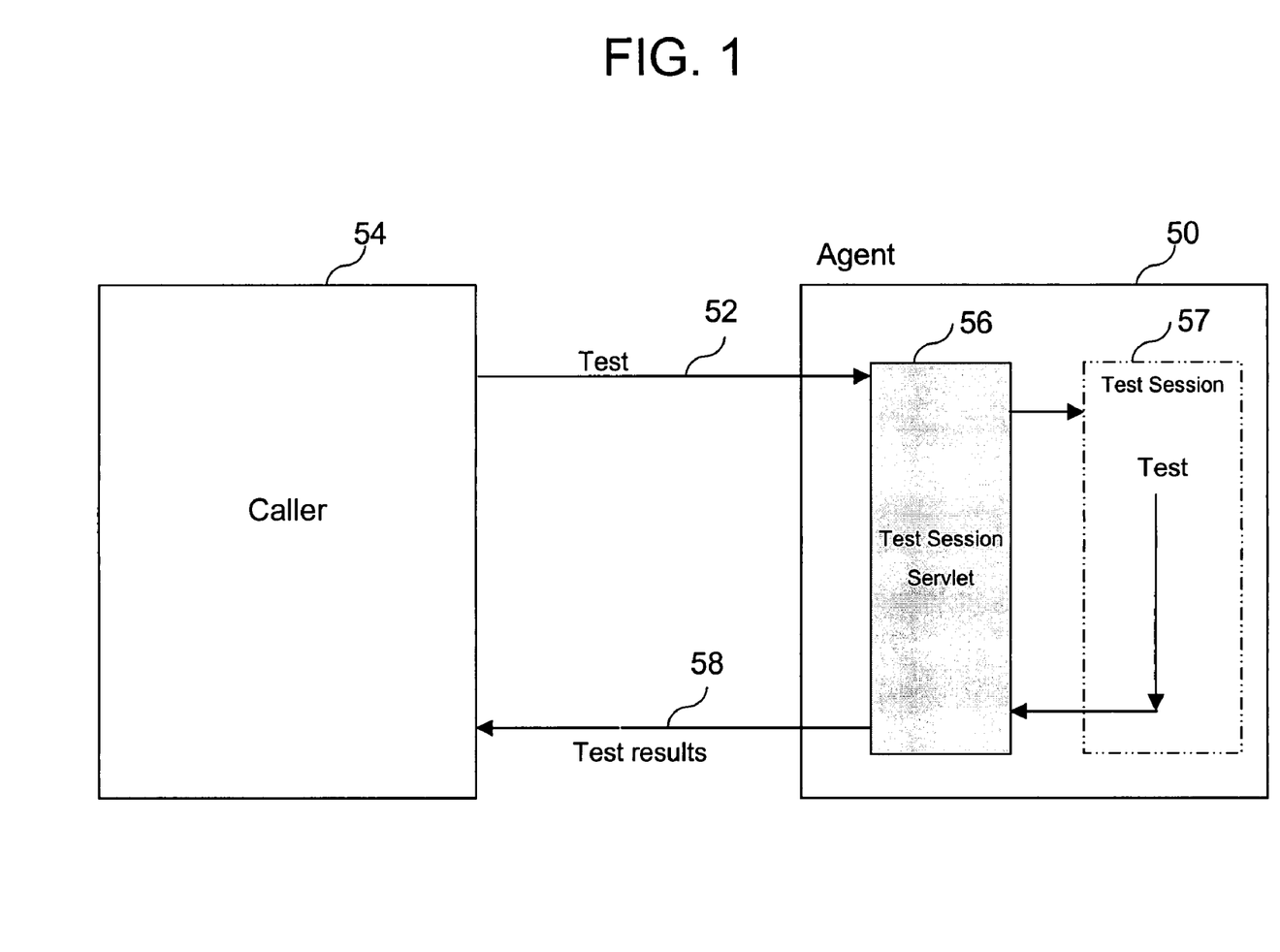
FIG. 1 illustrates a first embodiment of the present invention.

FIG. 1 illustrates a first embodiment of the present invention. A test session servlet is, for example, a multi-threaded program running on each agent of a system under examination. In other words, each agent runs a test session servlet, which can thread multiple test sessions in parallel. Each test session can invoke its respective agent to run tests or subtests. Referring to FIG. 1, an agent 50 has a first test session servlet 56 running on the agent 50. The first test session servlet 56 receives a test 52 from a caller 54, such as a third party software application, and threads a test session 57, which invokes the agent 50 to run the test 52. The agent 50 runs the test 52, and the first test session servlet 56 receives test results 58 from the test session 57, and sends the test results 58 back to the caller 54.

Figure 2:
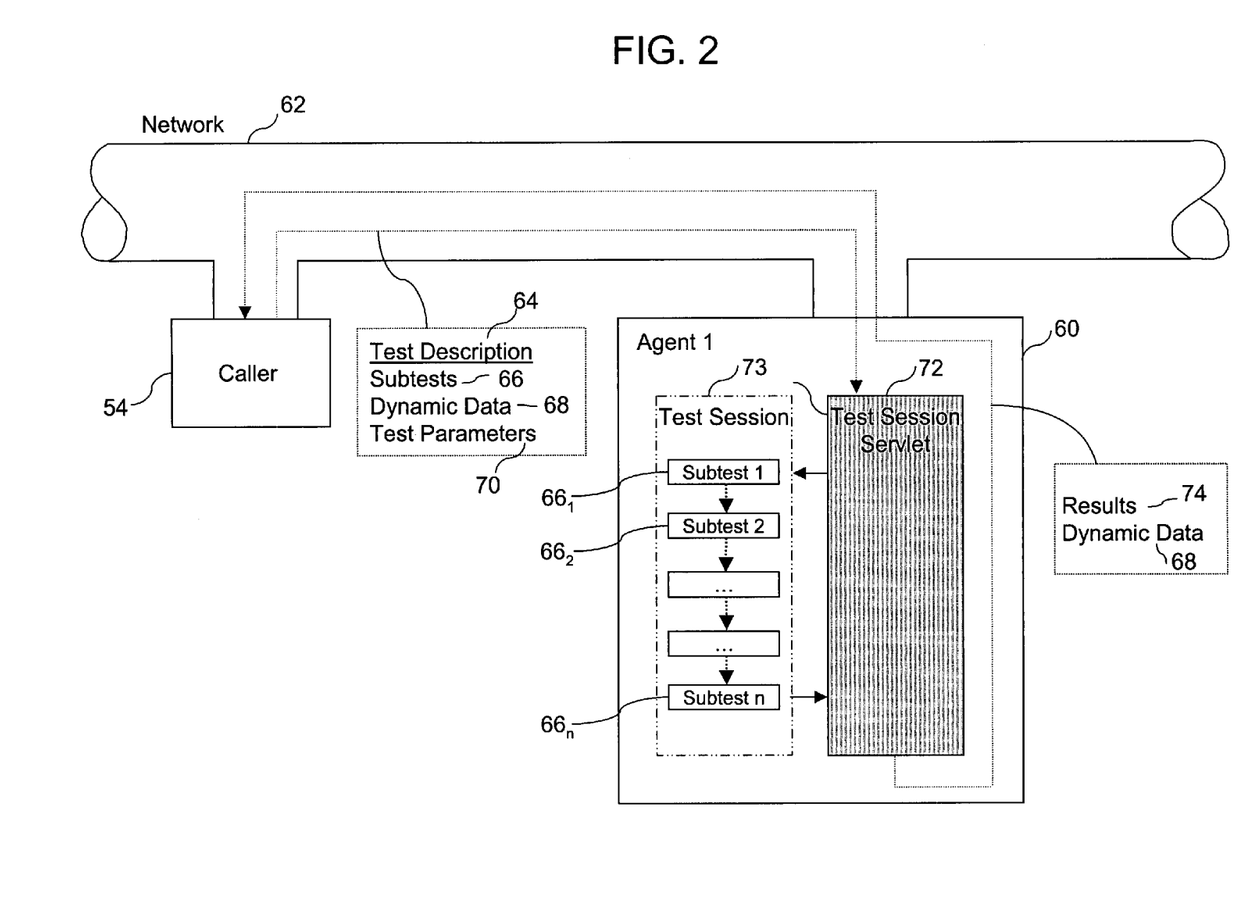
FIG. 2 illustrates a second embodiment of the present invention.

FIG. 2 illustrates a second embodiment of the present invention. Referring to FIG. 2, there is an agent (Agent 1) 60 on a network 62. A first test session servlet 72 runs on the agent 60, and receives a test description 64 in a predetermined format over the network 62 from the caller 54. The test description 64 includes at least one predefined subtest 66, dynamic data 68, and predefined test parameters 70. The first test session servlet 72 threads a first test session 73 that invokes the agent 60 to run the subtest 66 to test the network 62. After completion of the subtest 66, the first test session servlet 72 receives subtest results 74 from the first test session 73, and sends the subtest results 74 and the dynamic data 68 back to the caller 54.

According to one aspect, the subtest 66 is a plurality of subtests $66_1, 66_2, \ldots, 66_n$, such as FIG. 2 illustrates. Once all the subtests $66_1, 66_2, \ldots, 66_n$ are completed, the test session servlet 72 receives the results of all the subtests 74 from the first test session 73, and sends the results of all the subtests 74 and the dynamic data 68 back to the caller 54.

As one of ordinary skill in the art will appreciate, the caller may be located remotely from the agent 60, (or, according to one aspect, a plurality of agents) as long as the caller 54 is connected to the network 62. One of ordinary skill in the art will also appreciate that the network 62 may be any network, for example, the internet.

According to one aspect, the first test session 73 has an associated data store (not shown). The associated data store comprises a dynamic data store and a fixed data store. The dynamic data 68 is stored in the dynamic data store, and the parameters 70 and the subtest results 74 are stored in the fixed data store.

The dynamic data is available, in the dynamic data store, to all subtests $66_1, 66_2, \ldots, 66_n$, and is modifiable by each subtest $66_1, 66_2, \ldots, 66_n$. Once all the subtests $66_1, 66_2, \ldots, 66_n$ are run, the dynamic data, as modified by the subtests $66_1, 66_2, \ldots, 66_n$, is sent back to the caller 54 by the test session servlet 72.

According to one aspect, the agent 60 is a computer.

According to one aspect, the agent 60 has a default network interface (not shown) and a transient network interface (not shown). And when the dynamic data 68 specifies using the transient network interface when running the subtest 66, or any of the plurality of subtests $66_1, 66_2, \ldots, 66_n$, the first test session servlet 72 uses the transient network interface. The default network interface may be, for example, an interface to a LAN, and the transient network interface may be, for example, GPRS, or dialup.

According to one aspect, the agent 60 is one of a plurality of agents (not shown) connected to the network 62. Each of the plurality of agents runs a test session servlet, and the caller is not one of the plurality of agents.

According to one aspect, execution of the subtest 66 or the plurality of subtests $66_1, 66_2, \ldots, 66_n$, is not scheduled through a centralized agent scheduler (not shown). In other words, the at least one subtest 66 or the plurality of subtests $66_1, 66_2, \ldots, 66_n$ is run "on demand" from the caller 54.

Figure 3:
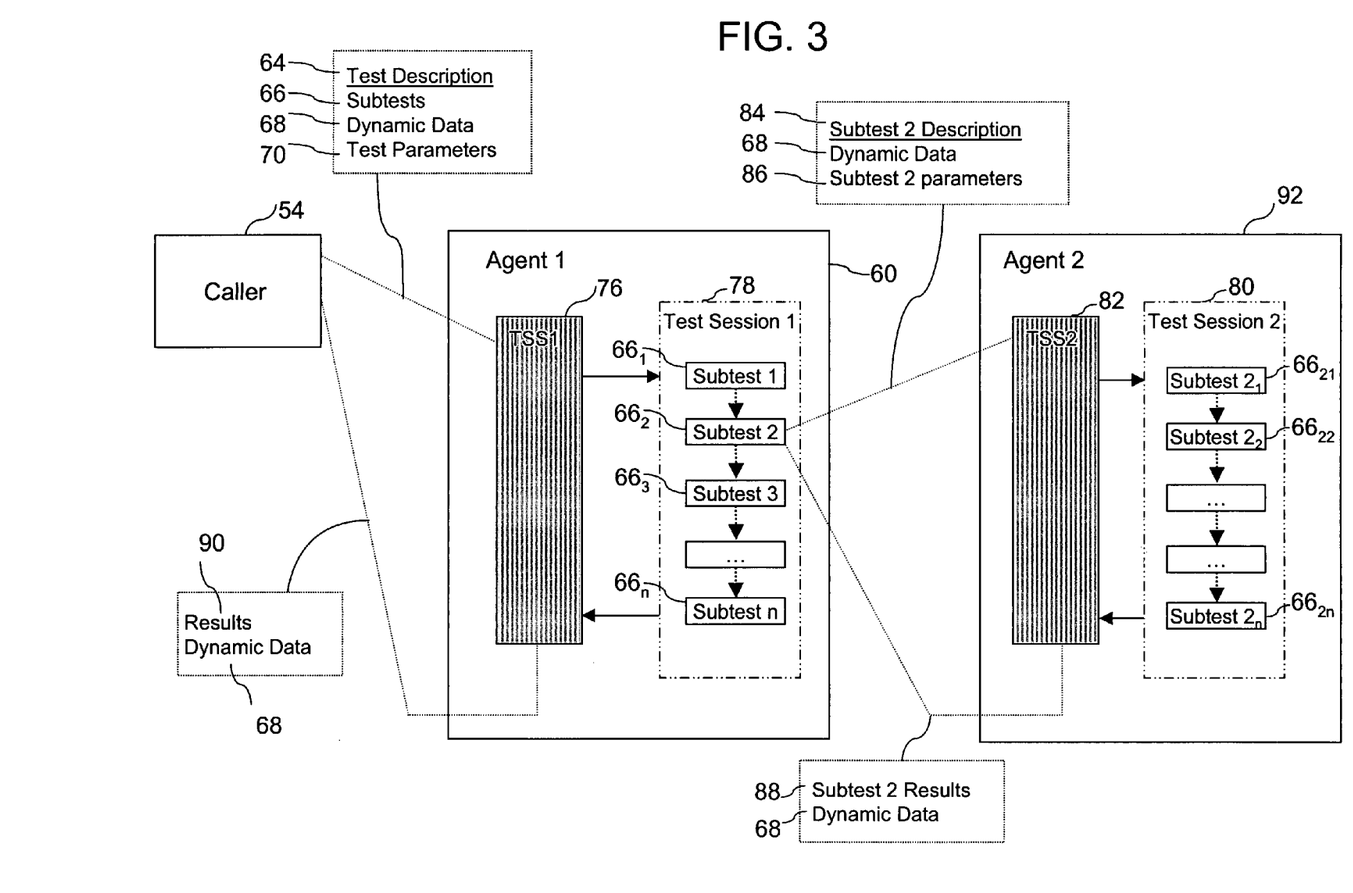
FIG. 3 illustrates a third embodiment of the present invention.

FIG. 3 illustrates a third embodiment of the present invention. Referring to FIG. 3, a first agent (Agent 1) 60 is running a first test session servlet (TSS1) 76, which receives the test description 64 in a predetermined format from the caller 54. The test description includes subtests 66, the dynamic data 68, and the predefined test parameters 70. According to one aspect, the subtests 66 are first and second subtests 66₁ and 66₂. The first test session servlet (TSS1) 76 threads a first test session 78, which invokes the first agent 60 to run the first subtest $66_1$.

When the second subtest $66_2$ is defined to run on a second test session 80, the second subtest $66_2$ invokes a second test session servlet (TSS2) 82 running on a second agent 92, to thread the second test session 80. The second subtest $66_2$ then sends a second subtest description 84, including test parameters 86 for the second subtest $66_2$ and the dynamic data 68, to TSS2 82, and the second test session 80 invokes the second agent 92 to run the second subtest $66_2$.

Then, the second subtest $66_2$ of TSS1 76, receives second subtest results 88 and the dynamic data 68 from the invocation of TSS2 82. Then, TSS1 76 sends subtest results 90 from all subtests and the dynamic data 68 back to the caller.

According to one aspect, each test session servlet 76 and 82 can thread multiple test sessions that run in parallel.

According to one aspect, as is shown in the embodiment illustrated in FIG. 3, the first subtest 66₁ comprises a plurality of subtests $66_1, 66_3, \ldots, 66_n$, and the first test session 78 invokes the first agent 60 to run the plurality of subtests $66_1, 66_3, \ldots, 66_n$. And the second subtest $66_2$ comprises a plurality of subtests $66_{21}, 66_{22}, \ldots, 66_{2n}$ which the second test session 80 invokes the second agent 92 to run.

According to one aspect, each test session has an associated data store comprising a dynamic data store and a fixed data store (not shown). The dynamic data 68 is stored in the dynamic data store and the parameters (for example, 70 and 86) and the subtest results (for example, 88 and 90) are stored in the fixed data store.

The dynamic data 68 is available, in the respective dynamic data stores, to all subtests that a given test session invokes the corresponding agent to run. In addition, the dynamic data 68 is modifiable by each subtest that a given test session invokes the corresponding agent to run.

Referring to FIG. 3, once the second subtest $66_2$ sends the second subtest description 84, the second test session 80 invokes the second agent 92 to run the plurality of subtests $66_{21}$, $66_{22}$, . . . , $66_{2n}$. One of ordinary skill in the art will appreciate that any of these subtests $66_{21}$, $66_{22}$, . . . , $66_{2n}$ may access and modify the dynamic data 68 (which is stored in the dynamic data store of the second test session 80), and may invoke a test session on the respective test session servlet of the first agent 60, the second agent 82, or another agent (not shown), as necessary to complete the given subtest.

Once subtest $66_{2n}$ is complete, TSS2 82 sends the results of all the subtests $66_{21}$, $66_{22}$, . . . , $66_{2n}$ and the dynamic data 68 in its current state (it may have been modified by any of the subtests $66_{21}$, $66_{22}$, . . . , $66_{2n}$) to the second subtest $66_2$ in the first test session 78. The second subtest $66_2$ in the first test session 78 then updates the dynamic data in the dynamic data store of the first test session, and stores the results of all the subtests $66_{21}$, $66_{22}$, . . . , $66_{2f}$ in the fixed data store of the first test session 78.

The first test session 78 then invokes the first agent 60 to run any remaining subtests $66_3$, . . . , $66_n$, each of which may modify the dynamic data 68. Then, TSS1 76 sends the results of all the subtests 90 and the dynamic data 68 in its current state back to the caller 54.

According to one aspect, the predetermined format of the test description 64 is a predefined XML schema in either an HTTP post or an HTTPS post. HTTP (Hyper Text Transfer Protocol) is a generic message transport standard, or in other words, a standardized way of communicating over the internet. An HTTP Get is what a web browser does; it only receives data. But an HTTP Post allows sending of a body of data and also receipt of an answer.

The body of data sent by the HTTP Post is organized via the XML schema. XML (Extensible Markup Language) is a standardized way of encoding data, or in other words, genericizing the data, enabling definition, transmission, validation, and interpretation of the data between applications.

Figure 4:
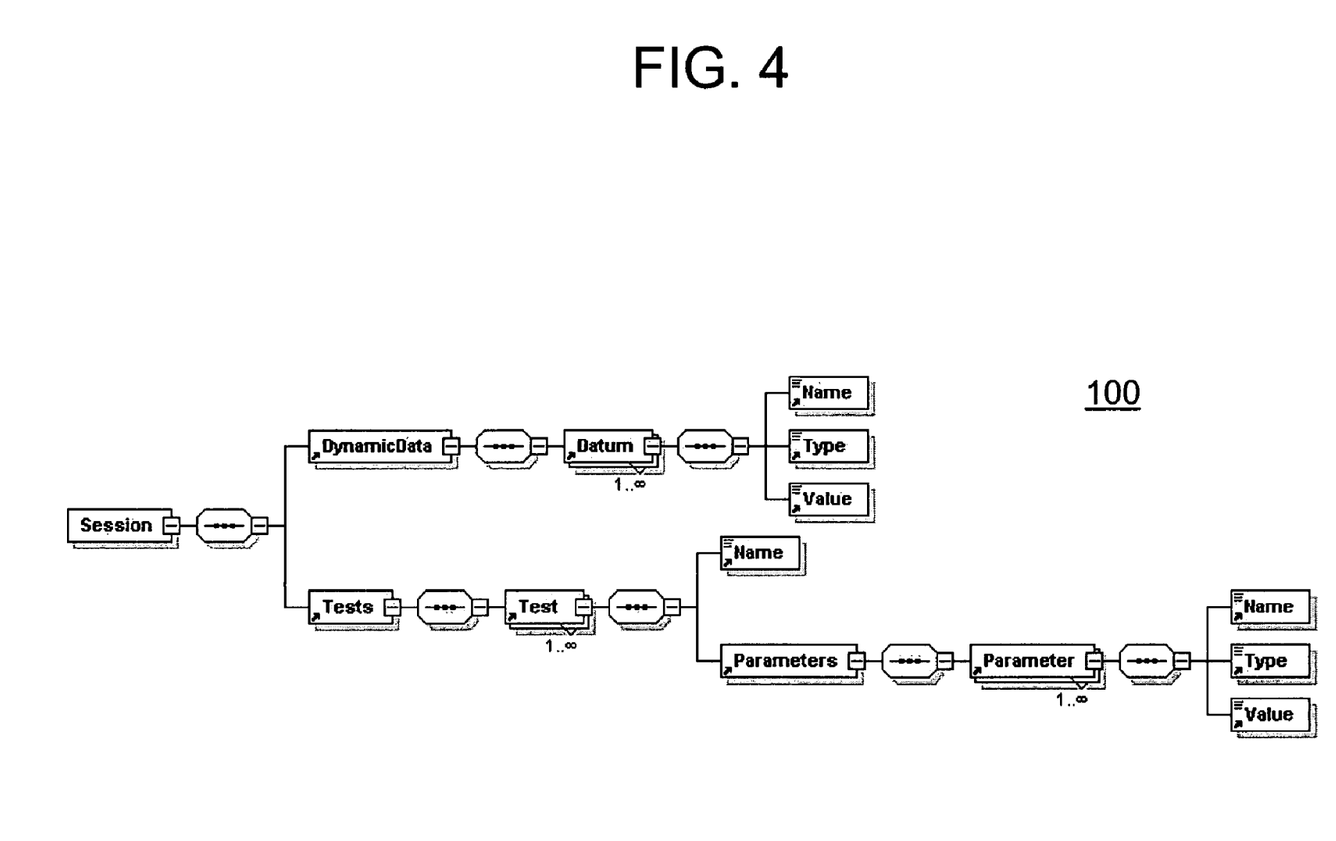
FIG. 4 illustrates a Test Session Servlet Input Schema according to an embodiment of the present invention.

FIG. 4 illustrates an example of a test session servlet input XML schema 100 according to an embodiment of the present invention. The following is a text representation of the test session servlet input schema 100.

```
<xs:schema xmlns:xs="http://www.w3.org/2001/XMLSchema"
    elementFormDefault="qualified">
    <xs:element name="Datum">
        <xs:complexType>
            <xs:sequence>
                <xs:element ref="Name"/>
                <xs:element ref="Type"/>
                <xs:element ref="Value"/>
            </xs:sequence>
        </xs:complexType>
    </xs:element>
    <xs:element name="DynamicData">
        <xs:complexType>
            <xs:sequence>
                <xs:element ref="Datum" maxOccurs=
                    "unbounded"/>
            </xs:sequence>
        </xs:complexType>
    </xs:element>
```

-continued

```
    <xs:element name="Name" type="xs:string"/>
    <xs:element name="Parameter">
        <xs:complexType>
            <xs:sequence>
                <xs:element ref="Name"/>
                <xs:element ref="Type"/>
                <xs:element ref="Value"/>
            </xs:sequence>
        </xs:complexType>
    </xs:element>
    <xs:element name="Parameters">
        <xs:complexType>
            <xs:sequence>
                <xs:element ref="Parameter" maxOccurs=
                    "unbounded"/>
            </xs:sequence>
        </xs:complexType>
    </xs:element>
    <xs:element name="Session">
        <xs:complexType>
            <xs:sequence>
                <xs:element ref="DynamicData"/>
                <xs:element ref="Tests"/>
            </xs:sequence>
        </xs:complexType>
    </xs:element>
    <xs:element name="Test">
        <xs:complexType>
            <xs:sequence>
                <xs:element ref="Name"/>
                <xs:element ref="Parameters"/>
            </xs:sequence>
        </xs:complexType>
    </xs:element>
    <xs:element name="Tests">
        <xs:complexType>
            <xs:sequence>
                <xs:element ref="Test" maxOccurs=
                    "unbounded"/>
            </xs:sequence>
        </xs:complexType>
    </xs:element>
    <xs:element name="Type" type="xs:string"/>
    <xs:element name="Value" type="xs:string"/>
</xs:schema>
```

Figure 5:
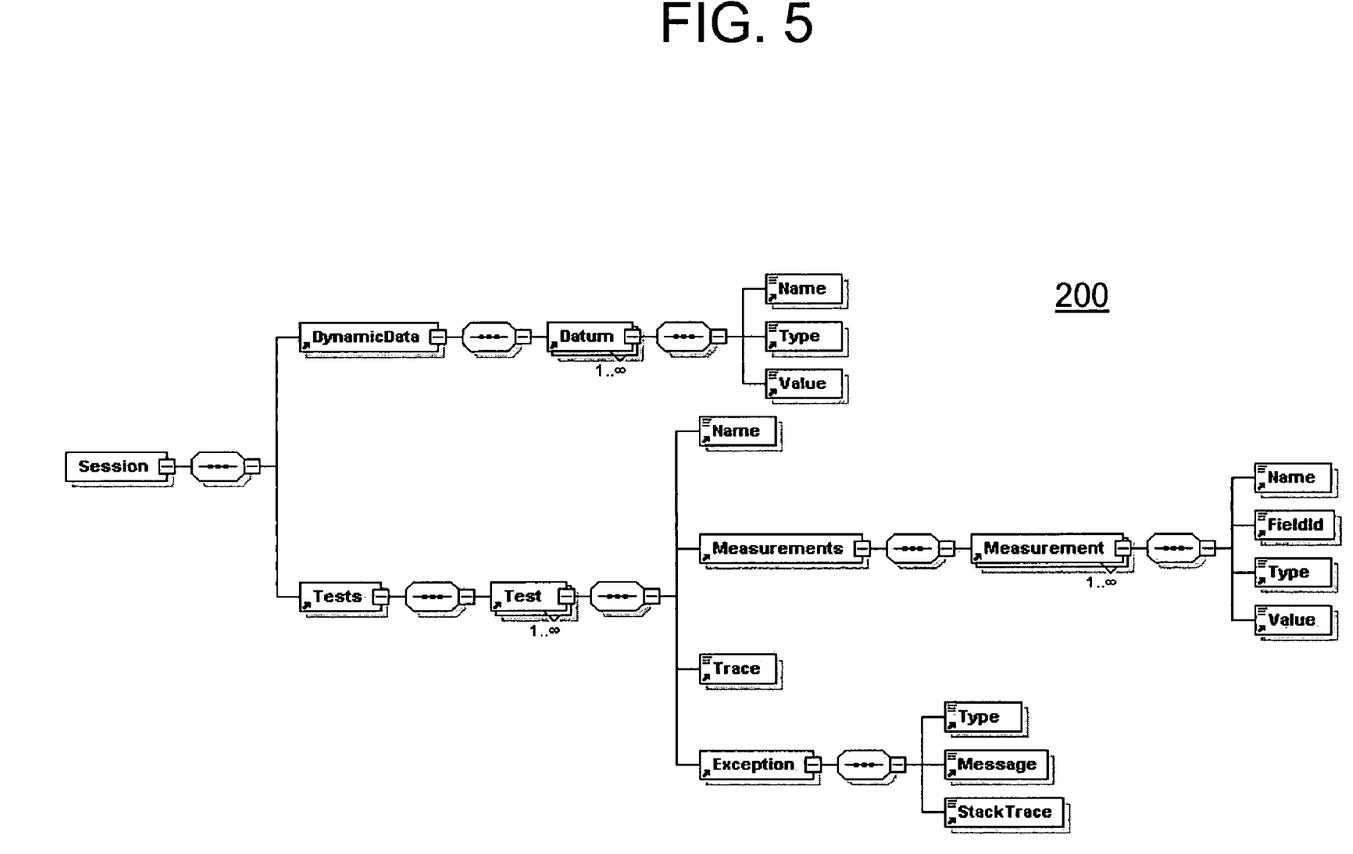
FIG. 5 illustrates a Test Session Servlet Output Schema according to an embodiment of the present invention.

FIG. 5 illustrates an example of a test session servlet output XML schema 200 according to an embodiment of the present invention. The following is a text representation of the test session servlet output schema 200.

```
<xs:element name="Datum">
    <xs:complexType>
        <xs:sequence>
            <xs:element ref="Name"/>
            <xs:element ref="Type"/>
            <xs:element ref="Value"/>
        </xs:sequence>
    </xs:complexType>
</xs:element>
<xs:element name="DynamicData">
    <xs:complexType>
        <xs:sequence>
            <xs:element ref="Datum" maxOccurs=
                "unbounded"/>
        </xs:sequence>
    </xs:complexType>
</xs:element>
<xs:element name="Exception">
    <xs:complexType>
        <xs:sequence>
```

-continued

```
            <xs:element ref="Type"/>
            <xs:element ref="Message"/>
            <xs:element ref="StackTrace"/>
        </xs:sequence>
    </xs:complexType>
</xs:element>
<xs:element name="FieldId" type="xs:integer"/>
<xs:element name="Measurement">
    <xs:complexType>
        <xs:sequence>
            <xs:element ref="Name"/>
            <xs:element ref="FieldId"/>
            <xs:element ref="Type"/>
            <xs:element ref="Value"/>
        </xs:sequence>
    </xs:complexType>
</xs:element>
<xs:element name="Measurements">
    <xs:complexType>
        <xs:sequence>
            <xs:element ref="Measurement" maxOccurs=
                "unbounded"/>
        </xs:sequence>
    </xs:complexType>
</xs:element>
<xs:element name="Message" type="xs:string"/>
<xs:element name="Name" type="xs:string"/>
<xs:element name="Session">
    <xs:complexType>
        <xs:sequence>
            <xs:element ref="DynamicData"/>
            <xs:element ref="Tests"/>
        </xs:sequence>
    </xs:complexType>
</xs:element>
<xs:element name="StackTrace" type="xs:string"/>
<xs:element name="Test">
    <xs:complexType>
        <xs:sequence>
            <xs:element ref="Name"/>
            <xs:element ref="Measurements"/>
            <xs:element ref="Trace"/>
            <xs:element ref="Exception"/>
        </xs:sequence>
    </xs:complexType>
</xs:element>
<xs:element name="Tests">
    <xs:complexType>
        <xs:sequence>
            <xs:element ref="Test" maxOccurs=
                "unbounded"/>
        </xs:sequence>
    </xs:complexType>
</xs:element>
<xs:element name="Trace" type="xs:string"/>
<xs:element name="Type" type="xs:string"/>
<xs:element name="Value" type="xs:string"/>
</xs:schema>
```

The test session servlet input and output schemata shown above and illustrated in FIGS. 4 and 5 are only examples. The present invention is not limited to these test session servlet input and output schemata, and other schemata may be used. Further, the schemata of the present invention are not limited to XML, and other protocols may be used.

According to one aspect, operation of a test session servlet requires an HTTP post where the body of the post follows, for example, the XML input specifications noted above. The test session servlet will then run all the tests in sequential order while maintaining dynamic data 68 sent in, or generated by the tests it is running, for use by subsequent subtests, test session servlets, or third parties. The results of all subtests along with the dynamic data 68 are sent back to the caller in the response to the HTTP post in the format of, for example, the XML output specifications noted above.

Thus, as can be seen from the previous description, the present invention provides for on-demand access to subtests, and enforces sequential execution of subtests. Additionally, the present invention handles robust sharing and exchange of the dynamic data 68 between subtests and other test session servlets, and/or third party software or custom modules. Further, the present invention provides for cascading levels of test session servlets that can be called one from another as needed, and each subtest can use, add to, or modify the dynamic data 68 from prior subtests or test session servlets as needed.

In addition, the present invention allows networked remote test session servlets to be called on other agents. As one of ordinary skill in the art will appreciate, this allows distributed networked subtest execution among test points to interact with complex distributed services. For example, a subtest running on one type of agent that has a certain set of capabilities that are not sufficient to complete the subtest can call another test session servlet on an agent that can provide the needed capabilities. Further, the dynamic data 68 can be utilized all the way through the transaction.

Further, the present invention provides for an interface that is a simple HTTP Post, with an XML body, which reduces the complexity of remote test sessions. This present invention also provides for a secure interface using an HTTPS Post.

Also, the present invention provides for testing of both a default network interface and a transient network interface. Thus, the distributed networked subtest execution among test points is advantageous because it allows the flexibility to offer software solutions that can test a wide variety of applications on wire line and/or wireless networks.

Various protocols are described herein, such as XML, HTTP, and HTTPS. The present invention in not limited to these protocols, and other protocols can be used. Similarly, various networks are described herein, such as a LAN, a wireless network, a wire line network, and the internet. The present invention in not limited to these networks, and other networks can be used.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus comprising:
   a first agent; and
   a first test session servlet running on the first agent, receiving a test description in a predetermined format from a caller, the test description including at least two subtests, dynamic data, and predefined test parameters, threading a first test session that invokes the first agent to run a first subtest of the at least two subtests, and when a second subtest of the at least two subtests is defined to run on a second test session, the second subtest
      invokes a second test session servlet running on a second agent to thread the second test session,
      sends a second subtest description, including test parameters for the second subtest and the dynamic data, to the second test session servlet, the second test session invoking the second agent to run the second subtest, and
      receives second subtest results and the dynamic data from the second test session servlet, the first test session servlet receiving subtest results from the first test session and sending subtest results from all subtests and the dynamic data back to the caller.

2. The apparatus according to claim 1, wherein:
each test session servlet threads multiple test sessions that run in parallel.

3. The apparatus according to claim 1, wherein:
each test session has an associated data store comprising a dynamic data store and a fixed data store; and
the dynamic data is stored in the dynamic data store and the parameters and the subtest results are stored in the fixed data store.

4. The apparatus according to claim 1, wherein:
the predetermined format of the test description is a predefined XML schema in one of an HTTP post and an HTTPS post.

5. An apparatus, comprising:
an agent on a network, the agent having a default network interface and a transient network interface; and
a first test session servlet running on the agent, receiving a test description in a predetermined format over the network from a caller, the test description including at least one predefined subtest, dynamic data that specifies using the transient network interface, and predefined test parameters, threading a first test session that invokes the agent and uses the transient network interface to run the at least one subtest to test the network, receiving subtest results from the first test session, and sending the subtest results from the at least one subtest and the dynamic data back to the caller.

6. The apparatus according to claim 5, wherein:
the at least one subtest comprises at least first and second subtests, and the second subtest is defined to run on a second test session; and
the second subtest
    sends a second subtest description, including test parameters for the second subtest and the dynamic data, to the second test session, to run the second subtest to test the network, and receives second subtest results and the dynamic data.

7. The apparatus according to claim 6, wherein:
each test session servlet threads multiple test sessions that run in parallel.

8. The apparatus according to claim 6, wherein the second subtest:
    invokes a second test session servlet running on a second agent on the network to thread the second test session,
    sends the second subtest description to the second test session servlet, the second test session invoking the second agent to run the second subtest, and
    receives second subtest results and the dynamic data from the second test session servlet.

9. The apparatus according to claim 8, wherein:
each test session has an associated data store comprising a dynamic data store and a fixed data store; and
the dynamic data is stored in the dynamic data store and the parameters and the subtest results are stored in the fixed data store.

10. The apparatus according to claim 5, wherein the agent comprises:
a computer.

11. The apparatus according to claim 5, wherein:
the predetermined format of the test description is a predefined XML schema in one of an HTTP post and an HTTPS post.

12. The apparatus according to claim 5, wherein:
the agent is one of a plurality of agents connected to the network, the plurality of agents respectively running a plurality of test session servlets; and
the caller is not one of the plurality of agents.

13. The apparatus according to claim 5, wherein:
execution of the at least one subtest is not scheduled through a centralized agent scheduler.

14. The apparatus according to claim 5, wherein:
the first test session has an associated data store comprising a dynamic data store and a fixed data store; and
the dynamic data is stored in the dynamic data store and the parameters and the subtest results are stored in the fixed data store.

* * * * *